(12) United States Patent
Stamper

(10) Patent No.: US 6,264,198 B1
(45) Date of Patent: Jul. 24, 2001

(54) METHOD, SYSTEM AND COMPUTER-READABLE MEDIUM FOR A MOVING VIDEO IMAGE JIGSAW PUZZLE GAME

(75) Inventor: Timothy David Joseph Stamper, Ravenstone (GB)

(73) Assignee: Rare Limited, Warwickshire (GB)

(*) Notice: Subject to any disclaimer, the term of this patent is extended or adjusted under 35 U.S.C. 154(b) by 0 days.

(21) Appl. No.: 09/342,525

(22) Filed: Jun. 29, 1999

(51) Int. Cl.[7] .......................................... A63F 9/10
(52) U.S. Cl. ................... 273/157 R; 273/153 R; 463/9; 463/31; 463/35
(58) Field of Search ............... 273/157 R, 153 R; 463/9, 31, 35

(56) References Cited

U.S. PATENT DOCUMENTS

| | | |
|---|---|---|
| 5,296,845 | 3/1994 | Haller . |
| 5,465,982 | 11/1995 | Rebane . |
| 5,556,339 * | 9/1996 | Cohen ........................ 463/1 |
| 5,577,185 | 11/1996 | Tunnell et al. . |
| 5,605,332 | 2/1997 | Harnett . |
| 5,630,754 | 5/1997 | Rebane . |
| 5,643,084 | 7/1997 | Mirsky . |
| 5,810,356 * | 9/1998 | Green ........................ 273/157 R |
| 5,944,605 * | 8/1999 | Pajitnov ........................ 463/9 |

OTHER PUBLICATIONS

"VidGrid," *The Rock Video Moving Puzzle Game*, CD game box.
"Kid VidGrid," *Cartoon Moving Puzzle Game*, CD game box.

* cited by examiner

*Primary Examiner*—Valencia Martin-Wallace
*Assistant Examiner*—Carmen D. White
(74) *Attorney, Agent, or Firm*—Christensen O'Connor Johnson Kindness PLLC

(57) ABSTRACT

A moving video image jigsaw puzzle game is provided that varies the level of difficulty in the game and that provides assistance to game players in solving a moving video image jigsaw puzzle. The moving video image jigsaw puzzle game is primarily implemented by a moving puzzle program (18). The moving puzzle program (18) generates a representative version of a moving puzzle image to be solved by a game player. This representative image is displayed on a display (14) along with puzzle pieces, each of which represents a portion of the full-color moving puzzle image. The representative image is used as a reference to reassemble the puzzle pieces to recreate the moving video image. The moving puzzle program (18) also provides other features for assisting game players, including: taking control of the movement of a puzzle piece and repositioning the puzzle piece exactly in its correct location on the display (14) upon determining that the game player has repositioned the puzzle piece within a predetermined marginal location of its correct location on the display (14); locking a puzzle piece into position on the display (14) once it has been properly repositioned by either the game player using the input device (24) or automatically by the moving puzzle program 18; identifying the correct location of a puzzle piece or automatically repositioning a puzzle piece (14) into its proper location upon a request for help from the game player or upon the occurrence of a predetermined event or an elapsed time period; changing the grid size of the moving video image to be solved upon request from the game player or based upon a selected difficulty level; and generating an audio signal for a puzzle piece upon selection of the puzzle piece by the game player to provide a clue regarding where to reposition the puzzle piece.

46 Claims, 4 Drawing Sheets

# METHOD, SYSTEM AND COMPUTER-READABLE MEDIUM FOR A MOVING VIDEO IMAGE JIGSAW PUZZLE GAME

FIELD OF THE INVENTION

The present invention relates to jigsaw puzzles in general, and in particular to moving video jigsaw puzzles.

BACKGROUND OF THE INVENTION

Traditional jigsaw puzzles made of paper and other durable materials have entertained puzzle players for decades. However, with the advent of personal computers, computer-generated jigsaw puzzles have also become popular.

In computer-generated jigsaw puzzles, a puzzle picture is electronically broken up into puzzle pieces and the puzzle pieces are scattered across an electronic viewing display. A player then manipulates the pieces on the display using a mouse, keyboard, joystick or other similar device to pick-up, rotate, reposition and connect puzzle pieces together until the puzzle picture is unscrambled.

Existing computer-generated jigsaw puzzle pictures include non-moving images, similar to puzzle pictures made of durable material, and moving images in which each puzzle piece includes a portion of the moving image. This change from still to animated or moving images increases the difficulty of the game.

One such computer-generated, moving jigsaw puzzle game is disclosed in U.S. Pat. No. 5,643,084. The Mirsky patent discloses a method for generating a moving image jigsaw puzzle game on an electronic display and controlling the play of the game in response to play operations. In particular, the Mirsky patent discloses how puzzle pieces are repositioned from one location to another on the visual display.

Such computer-generated moving image jigsaw puzzle games are often quite difficult for many players, especially young children and new players. Therefore, a need exists for a computer-generated moving image jigsaw puzzle game which enhances interaction and excitement for all game players by providing various levels of difficulty and by providing assistance to select game players in solving the moving image jigsaw puzzles.

SUMMARY OF THE INVENTION

The present invention provides a program for a moving video image jigsaw puzzle game that provides assistance to game players in solving a moving video image jigsaw puzzle. The moving video puzzle program assists the game players in solving the moving video jigsaw puzzle game by providing a variety of features which may be used either alone or in any combination with one another. First, the moving image puzzle program generates a representative version of a moving video image that is to be solved by a game player. Then, the moving puzzle program displays the moving representative image on a display together with puzzle pieces, each of which represents a portion of the full-color moving video image. The moving representative image is used by the player to provide guidance in reassembling the puzzle pieces to create the original moving video image. The game player may either use the moving representative image as merely a reference in solving the puzzle or may position puzzle pieces on top of the moving representative image until each of the puzzle pieces has been properly repositioned and the full color moving video image has been recreated on top of the moving representative image.

In accordance with other aspects of this invention, the moving puzzle program may take control of the movement of a puzzle piece from a player and place it in exactly the correct location once the player has repositioned this puzzle piece within a predetermined marginal location from the correct location. In addition, the predetermined marginal location can vary depending upon a difficulty level, typically chosen by a player at the start of a game. For example, an "easy" difficult level may provide for a wide margin in which the player must position a puzzle piece before the program finishes placement of the puzzle piece in its correct location.

In accordance with alternate aspects of this invention, the moving puzzle program also provides for the locking of puzzle pieces into position once the puzzle pieces have been properly repositioned by the game player using an input device. The puzzle pieces may be locked into position either within a frame that is used to recreate the moving video image or on top of the moving representative image. The moving puzzle program identifies the puzzle piece selected by the player and then determines whether the position to which the player moved the puzzle piece is the correct location. If the puzzle piece is in its correct location, the moving puzzle program locks it into this position so that it cannot be moved again by the player.

In accordance with further aspects of this invention, the moving puzzle program automatically repositions a puzzle piece into its proper location or identifies the proper location upon receiving a signal from the game player for assistance in solving the puzzle or upon the occurrence of a predetermine event or elapsed time period. The signal for help by the game player may be provided, for example, by clicking on a "reposition puzzle piece" button provided on the display by the moving puzzle program or other software running on the system. Once any such signal is received, either the moving puzzle program or the player selects a puzzle piece, and then the moving puzzle program automatically moves the selected puzzle piece into its proper location on the display without specific input from the player regarding where the puzzle piece should be repositioned. Alternatively, instead of automatically repositioning the puzzle piece, the moving puzzle program identifies the correct location of a puzzle piece by, for example, highlighting the area into which the currently selected puzzle piece fits.

In accordance with still further aspects of this invention, the moving puzzle program changes the grid size of the moving video image to be solved upon receiving a signal identifying a particular grid size selected by a game player. Any number of buttons may be provided to the player by the moving puzzle program or other software running on the system for making such a selection. Alternatively, the moving puzzle program can change the grid size based upon the difficulty level of the game, typically chosen by a player before commencing the game. In either scenario, the grid can be of regular or irregular shape.

In accordance with yet other further aspects of this invention, the moving puzzle program generates an audio signal for a puzzle piece upon selection of the puzzle piece by the game player. This audio signal provides a clue regarding the proper repositioning of the puzzle piece. The moving puzzle program first identifies the particular puzzle piece selected by the player. Then, the moving puzzle program determines whether the particular puzzle piece has an audio signal associated therewith. If the puzzle piece indeed has an associated audio signal, the moving puzzle program uses a sound generation unit to play the audio signal to the player to provide the player with a clue as to the proper repositioning of the puzzle piece.

A method and a system capable of performing actions generally consistent with any one or combination of the features of the moving puzzle program described above represent yet still further aspects of this invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a method, a system, and a computer-readable medium for a moving video image jigsaw puzzle game that enhances interaction and excitement for all players by providing features for varying the difficulty of the game in addition to features for assisting players in solving the puzzle.

Figure 1:
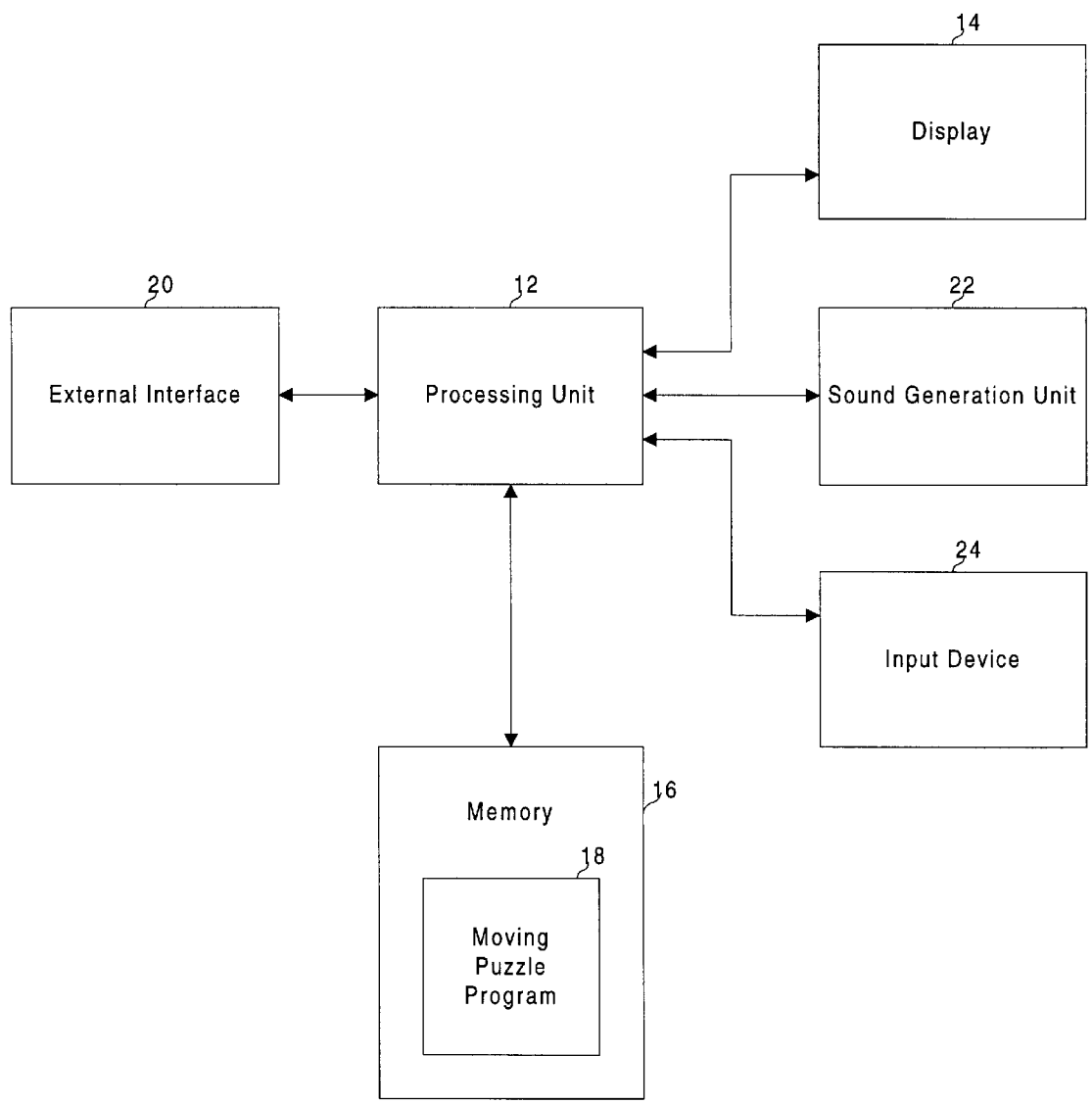
FIG. 1 is a block diagram of the several components of the system which implements the moving video image jigsaw puzzle game of the present invention.

FIG. 1 depicts several of the key components of a system in which the moving video image jigsaw puzzle game of the present invention is implemented. Those of ordinary skill in the art will appreciate that the system includes many more components than those shown in FIG. 1. However, it is not necessary that all of these generally conventional components be shown in order to disclose an illustrative embodiment for practicing the present invention. As shown in FIG. 1, the system 10 includes a processing unit 12, a display 14 and a memory 16.

Memory 16 generally includes a random access memory (RAM) and a permanent mass storage device, such as a hard disk drive, tape drive, optical drive, floppy disk drive, or a combination thereof. The memory 16 stores the program code and data necessary, if any, for implementing the moving video image jigsaw puzzle game of the present invention. More specifically, the memory 16 stores a moving puzzle program 18 formed in accordance with the present invention for implementing a moving video image jigsaw puzzle game that provides features for varying the difficulty of the game in addition to features for assisting players in solving the puzzle.

As will be appreciated by those skilled in the art and others, the moving puzzle program 18 and other data necessary, if any, for implementing the moving puzzle program 18 can be provided by any computer-readable media which can store data that is accessible by the system 10, including but not limited to cartridges, magnetic cassettes, flash memory cards, digital video disks, random access memories (RAMs), read-only memories (ROMs), and the like. In this regard, the system 10 is equipped to communicate with such computer-readable media in a manner well-known in the art.

It will be further appreciated by those skilled in the art and others that the moving puzzle program and other data necessary, if any, for implementing the moving puzzle program 18 can also be provided to the system 10 from any external data source capable of storing the program or data and communicating the program or data to the system 10. In this regard, the system 10 includes an external interface 20 for establishing a connection with the external data source. As an example, in one embodiment, the system 10 is connected to a local area network, which is in turn connected to the Internet. Accordingly, the external interface 20 includes the necessary means for making such a connection. It will be appreciated by those skilled in the art and others that the connection can be an acoustic, optical, electromagnetic radiation or physical communication link. The external interface 20 is also constructed for use with the Transmission Control Protocol/Internet Protocol (i.e., the standard transmission protocol for the Internet, also known as "TCP/IP"), the particular network configuration of the local area network it is connecting to, and a particular type of coupling medium. As a result, the external data source may be an Internet web site, i.e., a server connected to the Internet which has mass storage facilities. In other embodiments of the present invention, the external interface 18 comprises a modem.

The processing unit 12 of system 10 reads and executes the moving puzzle program 18 of the present invention. In this regard, the processing unit 12 causes the moving video image jigsaw puzzle game to be displayed on the display 14. The system 10 also includes a sound generation unit 22 for generating sound effects, if any, in accordance with the program and an input device 24 for allowing a game player to interact with the displayed moving video image jigsaw puzzle game. The input device 22 may be of any conventional type such as a keyboard, mouse, microphone, joystick, gamepad, satellite dish, scanner, controller, or the like.

It will be appreciated by those skilled in the art and others that the present invention can be implemented on any type of system that has a display component to depict the moving video image jigsaw puzzle game and at least one processing component to control play of the moving video image jigsaw puzzle game as disclosed herein. For example, the system can be a portable system such as handheld units like NINTENDO's portable GAMEBOY, a personal computer or a video game console with an attached monitor.

In general, the moving puzzle program 18 implemented by the processing unit 12 includes logic for generating a moving video image jigsaw puzzle game to be displayed and solved by a player on the display 14. A typical moving video image jigsaw puzzle game generates a moving video image that depicts, for example, a jungle scene. This moving video image is divided into separate puzzle pieces such that each puzzle piece depicts a portion of the moving video image. In one embodiment, the fully assembled moving video image is displayed on the display 14. Then, the fully assembled image is erased and replaced with the puzzle pieces necessary to recreate this image. These puzzle pieces are scattered across the display 14. Alternatively, in another embodiment, only the puzzle pieces are shown to the game player, without first displaying the fully assembled image.

Typically, a frame identifying the outer perimeter of the moving image can also be displayed and used for receiving puzzle pieces repositioned by a player in attempt to recreate the moving video image. The player repositions the puzzle pieces by using the input device 24 to, for example, select and "drag" a puzzle piece from one location on the display 14 to another. Other methods for using input devices for repositioning objects on a display may also be used, and many such methods are well-known in the art. Furthermore, the puzzle pieces may be scattered on the display 14 such that some or all of the puzzle pieces need to be rotated by a game player using the input device 24 before they can be properly positioned. Once all of the puzzle pieces have been correctly repositioned to recreate the original moving video image, the puzzle is complete.

One example of a typical moving video jigsaw puzzle is described in U.S. Pat. No. 5,643,084 to Mirsky, noted above, herein incorporated by reference. However, the techniques used to implement any of the above general features of a moving video image jigsaw video puzzle game, such as how the moving image is created, how puzzle pieces are created from the moving image, and how puzzle pieces are repositioned from one location on the visual display to another, are well-known in the art and, therefore, need not be described in further detail herein.

As will be described in further detail below, the moving puzzle program 18 of the present invention implements additional features to the moving video image jigsaw puzzle game which is described in general above. These additional features vary the difficulty of the game and provide assistance to game players in solving a puzzle. In general, these features include: generating a representative version of a moving video image to assist a player in solving a puzzle of that image; taking control of the movement of a puzzle piece from a player and positioning it in exactly the correct location once the player has positioned it within a predetermined marginal location from the correct location; locking a correctly repositioned puzzle piece into its proper location; identifying the correct location for a puzzle piece or automatically repositioning a puzzle piece without the aid of the player upon receiving a request for help or upon the occurrence of a predetermined event or elapsed time period; changing the grid size of the moving video image to be solved; and generating an audio signal upon selection of a puzzle piece that provides a clue regarding the proper repositioning of the puzzle piece.

Figure 2:
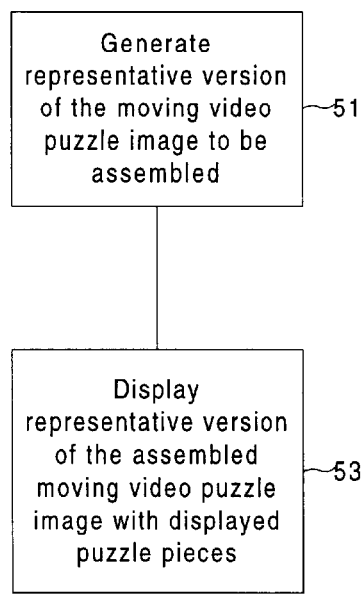
FIG. 2 is a block diagram illustrating logic used by the system shown in FIG. 1 for generating a representative version of a moving video image jigsaw puzzle image to assist a player in solving the puzzle in accordance with this invention.

FIG. 2 is a block diagram that depicts the logic used by the moving puzzle program 18 to generate a representative version of a moving video image to assist a player in solving the puzzle in accordance with one aspect of this invention. The representative version of the moving video image can, for example, be a monochromatic version, a version in which the colors are varied from those depicted in the original, a version in which the tint of the image is varied, or the like. First, at a step 51, upon receiving a signal from a player that the player desires to solve a puzzle, the moving puzzle program 18 generates a representative version of a moving video image that the player will be requested to solve on the display 14. This representative version is a moving representative image, and preferably, it is a "dimmed" version of the full-color original. Furthermore, the moving representative image preferably does not include lines that identify how the image has been divided into puzzle pieces.

Then, at a step 53, the moving puzzle program 18 displays the moving representative image on the display 14 along with the puzzle pieces, which are preferably in their original full-color. Furthermore, instead of only including the puzzle pieces necessary to solve the puzzle, additional puzzle pieces can be provided that are unnecessary for solving the puzzle, enhancing the difficulty of the game. Thereafter, in one embodiment, the player may use this representative image as a guide in repositioning the puzzle pieces on the display 14 or into a frame which can be provided on the display 14. Alternatively, in another embodiment, the puzzle pieces may be repositioned on top of the representative version of the moving video puzzle image to recreate the original full-color image. In this regard, once a puzzle piece is positioned on top of the moving representative image, the portion of the moving representative image underlying the repositioned puzzle piece is not visible to the player. As a result, once all of the puzzle pieces are properly repositioned, only the full-color moving video puzzle image is visible on the display 14. On the other hand, if a puzzle piece is moved from on top of the moving representative image to another location on the display 14, the portion of the moving representative image once underlying the puzzle piece is refreshed in a manner well-known in the art.

Figure 3:
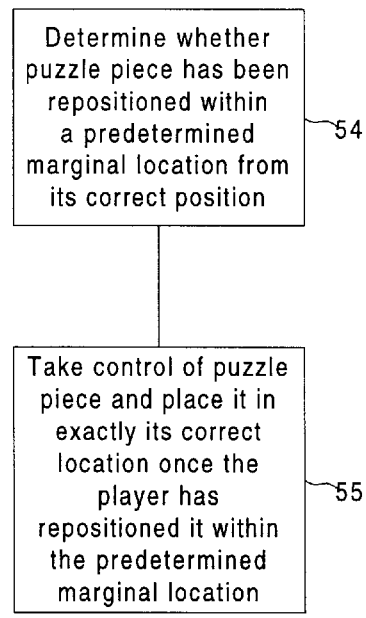
FIG. 3 is a block diagram illustrating logic used by the system shown in FIG. 1 for taking control of the movement of a puzzle piece from a game player and placing it in exactly the correct location once the player has positioned the puzzle piece within a predetermined marginal location from the correct location.

FIG. 3 is a block diagram that depicts the logic used by the moving puzzle program 18 to automatically take control of a puzzle piece from a player and position it in exactly the correct location in the frame or on top of the moving representative image once the player has repositioned the puzzle piece sufficiently near its correct location. First, at a step 54, the moving puzzle program 18 determines whether a puzzle piece has been repositioned within a predetermined marginal location of its correct location in the frame or on top of the moving representative image. Once the puzzle piece is repositioned within this predetermined marginal location, the moving puzzle program 18, at a step 55, takes control of the movement of the puzzle piece from the player and places the puzzle piece exactly into its correct location in the frame or on top of the moving representative image.

It will be appreciated by those skilled in the art and others that the predetermined marginal location can vary depending upon a difficulty level, typically chosen by a player at the start of a game. For example, an "easy" difficulty level may provide for a wide margin within which the player must reposition a puzzle piece before the program 18 automatically finishes the placement of the puzzle piece exactly into its correct location. In the same regard, a "medium" difficulty level may provide for a smaller margin, while a "hard" difficulty level may have no margin and thus require the player to manually position the puzzle piece in its correct location.

Figure 4:
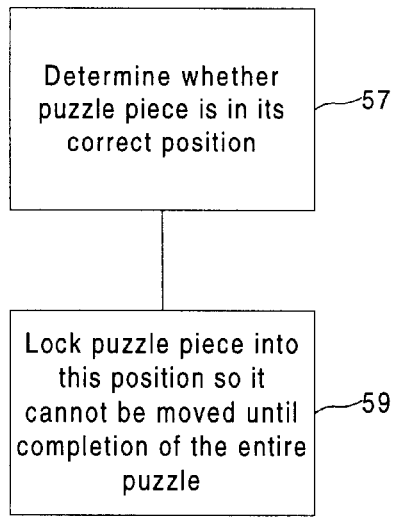
FIG. 4 is a block diagram illustrating logic used by the system shown in FIG. 1 for locking a correctly repositioned puzzle piece into place in accordance with this invention.

FIG. 4 is a block diagram that depicts the logic used by the moving puzzle program 18 to lock a correctly repositioned puzzle piece into place on the display 14. First, at a step 57, the moving puzzle program 18 determines whether a puzzle piece has been correctly repositioned by a player, either in the frame or on top of the moving representative image. Once a puzzle piece is properly repositioned, the moving puzzle program 18, at a step 59, locks the puzzle piece into position so that it cannot be moved until completion of the entire puzzle. It will further be appreciated that this feature may be provided for only certain difficulty levels.

Figure 5:
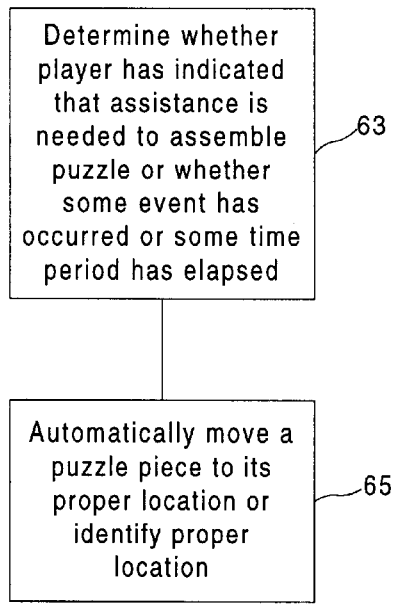
FIG. 5 is a block diagram illustrating logic used by the system shown in FIG. 1 for providing assistance to a player by either identifying the proper location of a puzzle piece or automatically repositioning a puzzle piece into its proper location in accordance with this invention.

FIG. 5 is a block diagram that depicts the logic used by the moving puzzle program 18 to either identify the correct location of a puzzle piece or automatically reposition a puzzle piece into its proper location either upon request by a game player or the occurrence of a predetermined event or an elapsed time period. Beginning at a step 63, the moving puzzle program 18 determines whether either a player has indicated that assistance is needed to assemble the puzzle; a predetermined event or bonus condition has occurred; or a time period has elapsed. In the first case, player can indicate the need for assistance by, for example, using the input device 24 to, for example, hit a "reposition puzzle piece" button shown on the display 14, which is provided by the moving puzzle program 18 or other software running on the system 10. This sends a signal to the processing unit 12 to automatically reposition one of the puzzle pieces. Additionally or alternatively, in the second and/or third cases, the moving puzzle program 18 can monitor the progress of the player such that upon the occurrence of a predetermined event, e.g., reaching a certain level of an associated game or correctly repositioning a certain number of puzzle pieces, or upon the lapse of a predetermined period of time, the program 18 automatically signals the processing unit to reposition a puzzle piece. Thereafter, in any of these three cases, at a step 65, the moving puzzle program 18 automatically moves a puzzle piece to its proper location, either in the frame or on top of the moving representative image. This automatic repositioning feature may also be used in conjunction with the correctly positioned puzzle piece lock feature, such that once a puzzle piece is automatically and correctly repositioned, this puzzle piece is locked into position so that the player cannot move it.

Alternatively, instead of automatically repositioning the puzzle piece, the moving puzzle program can identify the correct location of a puzzle piece by, for example, highlighting the area into which the currently selected puzzle piece fits.

This identification can also occur upon request by a player, upon the occurrence of an event or bonus condition or upon the elapse of a time period. See steps 63 and 65. Even further, in accordance with this aspect of the invention, it will be appreciated by those skilled in the art and others that if a puzzle piece that is not needed to solve the puzzle is located on the display, this piece can simply be identified as a bogus piece or moved to some remote location on the display.

Figure 6:
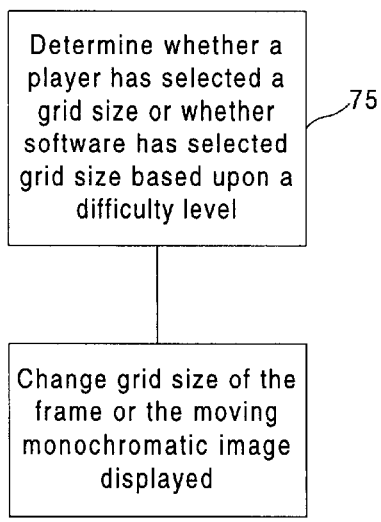
FIG. 6 is a block diagram illustrating logic used by the system shown in FIG. 1 for changing the grid size of a moving video image in accordance with this invention.

FIG. 6 is a block diagram that depicts the logic used by the moving puzzle program 18 to change the grid size of the frame or moving representative image shown on the display 14. The grid may be of regular or irregular shape. First, at a step 75, the moving puzzle program 18 determines whether a player has selected a grid size for the image to be solved. The player can make such a selection using the input device 24 by using a "change grid size" button which is provided on the display 14 by the moving puzzle program 18 or other software running on the system 10. Thereafter, the player is provided with a prompt on the display 14 to enter the requested grid size. Alternatively, the player is provided with a predetermined list of grid sizes for selection by the player. In either case, upon selecting the grid size, an appropriate signal is sent to the processing unit 12, and then, the moving puzzle program 18 changes the grid size of the frame or moving representative image displayed on the display 14.

Accordingly, by choosing a smaller grid size, the player also causes the moving puzzle program 18 to change the size of the puzzle pieces used to solve the puzzle. Therefore, by selecting a smaller grid size, the player is increasing the difficulty of the puzzle. Likewise, the player can also select a larger grid size to decrease the difficulty in solving the puzzle. Alternatively, it will be appreciated by those skilled in the art and others that the grid size can be selected by the program 18 based upon a difficulty level either selected by the player at the start of the game or determined by the program during the course of the game.

Figure 7:
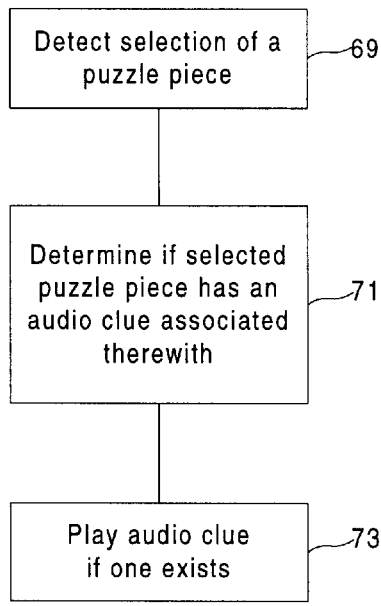
FIG. 7 is a block diagram illustrating logic used by the system shown in FIG. 1 for providing an audio signal associated with a puzzle piece upon selection of the puzzle piece by a player in accordance with this invention.

FIG. 7 is a block diagram that depicts the logic used by the moving puzzle program 18 to provide audio signals for select puzzle pieces such that upon selection of the puzzle piece by a game player, the moving puzzle program 18 provides a clue regarding the proper repositioning of the puzzle piece. First, at a step 69, the moving puzzle program 18 detects the selection of a puzzle piece by a player. Such a selection can be made by clicking on the puzzle piece using the input device 24, which in turn sends a signal to the processing unit 12 that the puzzle piece has been selected. The moving puzzle program 18 identifies the particular puzzle piece that has been selected in a manner well-known in the art.

Next, at a step 71, the moving puzzle program 18 determines if the selected puzzle piece has an audio signal associated therewith for providing a clue to the player regarding the proper repositioning of the puzzle piece. For example, once the particular puzzle piece selected by the game player has been identified, the moving puzzle program 18 may utilize a look-up table stored in memory 16 to determine if the identified puzzle piece has an audio signal associated with it. If the selected puzzle piece does have an audio signal, the moving puzzle program 18 thereafter generates the audio signal using the sound generation unit 43. As a practical example of this feature, if the moving video image depicts a scenery view that includes a volcano in a portion of the image, once a player selects a puzzle piece that represents the volcano section of the moving video image, the processing unit 12 provides an audio signal, such as the sound of an eruption, that would give the player a clue that this puzzle piece should be repositioned near the volcano area of the moving video image.

It will be appreciated by those skilled in the art and others that the moving video image jigsaw puzzle game as described above can be utilized in conjunction with other video games. In particular, a player of another video game may be required to solve a moving video image puzzle implemented by the moving puzzle program 18 in order to continue playing an associated video game or to reach a certain level in the associated video game. In this regard, program code used to implement the other video game may simply call the moving puzzle program 18 as a subroutine, such that once a puzzle is solved processing returns to the main program routine of the other video game.

Preferably, a moving puzzle program in accordance with the present invention will contain all of the features described above. However, it will be appreciated by those skilled in the art and others that a moving video image jigsaw puzzle game can be provided with one, all, or any combination of the features described herein for providing various levels of difficulty or providing assistance in solving the puzzle. It will also be appreciated that the features of the present invention may be automatically provided by the moving video jigsaw puzzle game or may be enabled and disabled by game players using any number of buttons on the display 14 provided by the moving puzzle program 18 or any other software running on the system 10.

As will be readily appreciated by those skilled in the art and others, a moving video jigsaw puzzle game formed in accordance with this invention has a number of advantages. Most importantly, by providing a moving video image jigsaw puzzle game that provides assistance to select players in solving a puzzle and therefore providing various levels of difficulty, the interaction with the game and the excitement of the game is enhanced for all game players.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for providing assistance to game players in solving a moving video image jigsaw puzzle game which is generated on a display, the moving video image jigsaw puzzle game having a moving video image divided into puzzle pieces, each puzzle piece depicting a portion of the moving video image, the puzzle pieces scattered on the display and selectable by game players for recreating the moving video image, the method comprising:

generating a representative version of the moving video image;

positioning the representative version of the moving video image on the display with the puzzle pieces for guidance in solving the moving video image jigsaw puzzle, and automatically repositioning a puzzle piece into its correct position upon determining a predetermined event has occurred.

2. The method of claim 1, further comprising repositioning a puzzle piece on top of a portion of the representative version of the moving video image as requested by the game player in attempt to recreate the moving video image on top of the representative version.

3. The method of claim 2, further comprising taking control of the movement of a puzzle piece from the game player and repositioning the puzzle piece exactly in its correct location on top of the representative version of the moving video image once the game player repositions the puzzle piece within a predetermined marginal location of its correct location.

4. The method of claim 3, further comprising locking a puzzle piece into position on top of the representative version of the moving video image once the puzzle piece is properly repositioned.

5. The method of claim 2, further comprising automatically repositioning a puzzle piece into its correct location upon receiving a request for help from the game player.

6. The method of claim 2, wherein the game player selects the grid size of the moving video image to be solved.

7. The method of claim 2, further comprising changing the grid size of the moving video image to be solved based upon a difficulty level of the game.

8. The method of claim 1, further comprising: generating an audio signal for a puzzle piece upon selection of the puzzle piece by the game player to provide a clue regarding the proper repositioning of the puzzle piece to recreate the moving video image.

9. A method for providing assistance to game players in solving a moving video jigsaw puzzle game which is generated on a display, the moving video jigsaw puzzle game having a moving video image divided into puzzle pieces, each puzzle piece depicting a portion of the moving video image, the puzzle pieces randomly scattered on the display and selectable by game players for recreating the moving video image, the method comprising:

identifying a puzzle piece selected by the game player;

determining whether the selected puzzle piece has an audio signal associated therewith for providing a clue regarding the proper repositioning of the puzzle piece to recreate the moving video image; and generating the audio signal for the selected puzzle piece if one exists.

10. The method of claim 9, further comprising generating a frame for receiving the puzzle pieces to recreate the moving video image.

11. The method of claim 10, further comprising taking control of the movement of a puzzle piece from the game player and repositioning the puzzle piece exactly in its correct location in the frame upon determining that the game player has repositioned the puzzle piece within a predetermined marginal location of its correct location in the frame.

12. The method of claim 10, further comprising locking a puzzle piece into position in the frame once the puzzle piece is properly repositioned in the frame.

13. The method of claim 10, further comprising identifying the correct location of a puzzle piece upon receiving a request for help from the game player.

14. The method of claim 10, further comprising identifying the correct location in the frame of a puzzle piece upon determining that a predetermined event has occurred.

15. A system for providing assistance to game players in solving a moving video image jigsaw puzzle game which is generated on a display, the moving video jigsaw puzzle game having a moving video image divided into puzzle pieces, each puzzle piece depicting a portion of the moving video image, the puzzle pieces scattered on the display and selectable by game players for recreating the moving image, the system comprising:

a processing component;

a display component coupled to the processing component; and a data storage component coupled to the processing component, the data storage component storing a moving puzzle program implemented by the processing component for:

(a) generating a representative version of the moving video image;

(b) positioning the representative version of the moving video image on the display with the puzzle pieces component for guidance in solving the moving video image jigsaw puzzle and (c) automatically repositioning a puzzle piece into its correct position upon determining a predetermined event has occurred.

16. The system of claim 15, wherein the program implemented by the processing component repositions a puzzle piece on top of a portion of the representative version of the moving video image as requested by the game player in attempt to recreate the moving image on top of the representative version.

17. The system of claim 16, wherein the program implemented by the processing unit takes control of the movement of a puzzle piece from the game player and repositions the puzzle piece exactly in its correct location on top of the representative version of the moving video image upon determining that the game player has repositioned the puzzle piece within a predetermined marginal location of its correct location.

18. The system of claim 16, wherein the program implemented by the processing unit locks a puzzle piece into position on top of the representative version of the moving video image once the puzzle piece is properly repositioned.

19. The system of claim 16, wherein the program implemented by the processing component automatically repositions a puzzle piece upon receiving a request for help from the game player.

20. The system of claim 16, wherein the program implemented by the processing component changes the grid size of the moving video image to be solved upon receiving a signal from the game player.

21. The system of claim 16, wherein the program implemented by the processing component changes the grid size of the moving video image based upon a difficulty level of the game.

22. The system of claim 15, wherein the program implemented by the processing component generates an audio signal for a puzzle piece upon selection of the puzzle piece by the game player to provide a clue regarding the proper repositioning of the puzzle piece to recreate the moving video image.

23. A system for providing assistance to game players in solving a moving video image jigsaw puzzle game which is generated on a display, the moving video jigsaw puzzle game having a moving video image divided into puzzle pieces, each puzzle piece depicting a portion of the moving video image, the puzzle pieces scattered on the display and selectable by game players for recreating the moving video image, the system comprising:
- a processing component;
- a display component coupled to the processing component; and
- a data storage component coupled to the processing component, the data storage component for storing a moving puzzle program implemented by the processing component for:
  - (a) identifying a puzzle piece selected by the game player;
  - (b) determining whether the selected puzzle piece has an audio signal associated therewith for providing a clue regarding the proper repositioning of the puzzle piece to recreate the moving video image; and
  - (c) generating the audio signal if one exists.

24. The system of claim 23, wherein the program implemented by the processing component generates a frame for receiving the puzzle pieces to recreate the moving video image.

25. The system of claim 24, wherein the program implemented by the processing component takes control of the movement of a puzzle piece from the game player and repositions the puzzle piece exactly in its location in the frame upon determining that the game player has repositioned the puzzle piece within a predetermined marginal location of its correct location in the frame.

26. The system of claim 24, wherein the program implemented by the processing component locks a puzzle piece into position in the frame once the puzzle piece is properly repositioned.

27. The system of claim 26, wherein the program implemented by the processing component identifies the correct position in the frame of a puzzle piece upon receiving a request for help from the game player.

28. The system of claim 26, wherein the program implemented by the processing component identifies the correct position of a puzzle piece upon the occurrence of a predetermined event.

29. A computer-readable medium having a computer-executable component for providing assistance to game players in solving a moving video image jigsaw puzzle game, the moving video jigsaw puzzle game having a moving video image divided into puzzle pieces, each puzzle piece depicting a portion of the moving video image, the puzzle pieces scattered on the display and selectable by game players for recreating the moving image, wherein the computer-executable component provides assistance to game players in solving the moving video image puzzle by:
- generating a representative version of the moving video image;
- positioning the representative version of the moving video image on the display with the puzzle pieces component for guidance in solving the moving video image jigsaw puzzle; and automatically repositioning a puzzle piece into its correct position upon determining a predetermined event has occurred.

30. The computer-readable medium of claim 29, wherein the computer-executable component repositions a puzzle piece on top of a portion of the representative version of the moving video image as requested by the game player in attempt to recreate the moving video image on top of the representative version.

31. The computer-readable medium of claim 29, wherein the computer-executable component further provides assistance to game players in solving the moving video image jigsaw puzzle game by taking control of the movement of a puzzle piece from a game player and repositioning the puzzle piece exactly in its correct location upon determining that the game player has repositioned the puzzle piece within a predetermined marginal location of its correct location.

32. The computer-readable medium of claim 30, wherein the computer-executable component further provides assistance to game players in solving the moving video image jigsaw puzzle game by locking a puzzle piece into position on top of the representative version of the moving video image once the puzzle piece is properly repositioned.

33. The computer-readable medium of claim 29, wherein the computer-executable component further provides assistance to game players in solving the moving video image jigsaw puzzle game by automatically repositioning a puzzle piece into its correct location upon receiving a request for help from the game player.

34. The computer-readable medium of claim 29, wherein the computer-executable component further provides assistance to game players in solving the moving video image jigsaw puzzle game by generating an audio signal for a puzzle piece upon selection of the puzzle piece by the game player to provide a clue regarding the proper repositioning of the puzzle piece to recreate the moving video image.

35. A computer-readable medium having a computer-executable component for providing assistance to game players in solving a moving video image jigsaw puzzle game, the moving video jigsaw puzzle game having a moving video image divided into puzzle pieces, each puzzle piece depicting a portion of the moving video image, the puzzle pieces scattered on the display and selectable by game players for recreating the moving video image, wherein the computer-executable component provides assistance to game players in solving the moving video image jigsaw puzzle game by:
- identifying a puzzle piece selected by a game player;
- determining whether the selected puzzle piece has an audio signal associated therewith for providing a clue regarding the proper repositioning of the puzzle piece to recreate the moving video image; and
- generating the audio signal if one exists.

36. The computer-readable medium of claim 35, wherein the computer-executable component generates a frame on the display for receiving the puzzle pieces to recreate the moving video image.

37. The computer-readable medium of claim 36, wherein the computer-executable component further provides assistance to game players in solving the moving video image jigsaw puzzle game by taking control of the movement of a puzzle piece and repositioning the puzzle piece in its correct location in the frame upon determining that the game player repositioned the puzzle piece within a predetermined marginal location of its correct location in the frame.

38. The computer-readable medium of claim 36, wherein the computer-executable component further provides assistance to game players in solving the moving video image jigsaw puzzle game by locking a puzzle piece into position in the frame once the puzzle piece is properly repositioned.

39. The computer-readable medium of claim 35, wherein the computer-executable component further provides assistance to game players in solving the moving video image jigsaw puzzle game by identifying the correct position for a puzzle piece upon receiving a request for help from the game player.

40. The computer-readable medium of claim 35, wherein the computer-executable component further provides assistance to game players in solving the moving video image jigsaw puzzle game by identifying the correct position of a puzzle piece upon the occurrence of a predetermined event.

41. A method for providing assistance to game players in solving a moving video image jigsaw puzzle game which is generated on a display the moving video image jigsaw puzzle game having a moving video image divided into puzzle pieces, each puzzle piece depicting a portion of the moving video image, the puzzle pieces scattered on the display and selectable by game players for recreating the moving video image the method comprising:

generating a representative version of the moving video image;

positioning the representative version of the moving video image on the display with the puzzle pieces for guidance in solving the moving video image jigsaw puzzle;

allowing the game player to select the grid size of the moving video image to be solved; and automatically repositioning a puzzle piece into its correct location upon receiving a request for help from the game player.

42. A method for providing assistance to game players in solving a moving video image jigsaw puzzle game which is generated on a display the moving video image jigsaw puzzle game having a moving video image divided into puzzle pieces each puzzle piece depicting a portion of the moving video image the puzzle pieces scattered on the display and selectable by game players for recreating the moving video image, the method comprising:

generating a representative version of the moving video image;

positioning the representative version of the moving video image on the display with the puzzle pieces for guidance in solving the moving video image jigsaw puzzle;

allowing the game player to select the grid size of the moving video image to be solved; and taking control of the movement of a puzzle piece from the game player and repositioning the puzzle piece exactly in its correct location on top of the representative version of the moving video image once the game player repositions the puzzle piece within a predetermined marginal location of its correct location.

43. A system for providing assistance to game players in solving a moving video image jigsaw puzzle game which is generated on a display the moving video jigsaw puzzle game having a moving video image divided into puzzle pieces, each puzzle piece depicting a portion of the moving video image, the puzzle pieces scattered on the display and selectable by game players for recreating the moving image, the system comprising:

a processing component;

a display component coupled to the processing component; and a data storage component coupled to the processing component, the data storage component storing a moving puzzle program implemented by the processing component for:

(a) generating a representative version of the moving video image;

(b) positioning the representative version of the moving video image on the display with the puzzle pieces component for guidance in solving the moving video image jigsaw puzzle;

(c) allowing the game player to select the grid size of the moving video image to be solved; and (d) repositioning a puzzle piece into its correct location upon receiving a request for help from the game player.

44. A system for providing assistance to game players in solving a moving video image jigsaw puzzle game which is generated on a display, the moving video jigsaw puzzle game having a moving video image divided into puzzle pieces, each puzzle piece depicting a portion of the moving video image the puzzle pieces scattered on the display and selectable by game players for recreating the moving image, the system comprising:

a processing component;

a display component coupled to the processing component; and a data storage component coupled to the processing component the data storage component storing a moving puzzle program implemented by the processing component for:

(a) generating a representative version of the moving video image;

(b) positioning the representative version of the moving video image on the display with the puzzle pieces component for guidance in solving the moving video image rigsaw puzzle;

(c) allowing the game player to select the grid size of the moving video image to be solved; and (d) taking control of the movement of a puzzle piece from the game player and repositioning the puzzle piece exactly in its correct location on top of the representative version of the moving video image once the game player repositions the puzzle piece within a predetermined marginal location of its correct location.

45. A computer-readable medium having a computer-executable component for providing assistance to game players in solving a moving video image jigsaw puzzle game, the moving video jigsaw puzzle game having a moving video image divided into puzzle pieces, each puzzle piece depicting a portion of the moving video image, the puzzle pieces scattered on the display and selectable by game players for recreating the moving image, wherein the computer-executable component provides assistance to game players in solving the moving video image puzzle by:

generating a representative version of the moving video image;

positioning the representative version of the moving video image on the display with the puzzle pieces component for guidance in solving the moving video image jigsaw nuzzle;

allowing the game player to select the grid size of the moving video image to be solved; and repositioning a puzzle piece into its correct location upon receiving a request for help from the game player.

46. A computer-readable medium having a computer-executable component for providing assistance to game players in solving a moving video image jigsaw puzzle game, the moving video jigsaw puzzle game having a moving video image divided into puzzle pieces, each puzzle piece depicting a portion of the moving video image, the puzzle pieces scattered on the display and selectable by game players for recreating the moving image, wherein the computer-executable component provides assistance to game players in solving the moving video image puzzle by:

generating a representative version of the moving video image;

positioning the representative version of the moving video image on the display with the puzzle pieces component for guidance in solving the moving video image jigsaw puzzle;

allowing the game player to select the grid size of the moving video image to be solved; and taking control of the movement of a puzzle piece from the game player and repositioning the puzzle piece exactly in its correct location on top of the representative version of the moving video image once the game player repositions the puzzle piece within a predetermined marginal location of its correct location.

* * * * *

UNITED STATES PATENT AND TRADEMARK OFFICE
CERTIFICATE OF CORRECTION

PATENT NO. : 6,264,198 B1
DATED : July 24, 2001
INVENTOR(S) : T.D.J. Stamper

It is certified that error appears in the above-identified patent and that said Letters Patent is hereby corrected as shown below:

Column 9
Line 26, "puzzle," should read -- puzzle; --

Column 10,
Line 46, "puzzle and" should read -- puzzle; and --

Column 12,
Line 12, the clause beginning "automatically repositioning a puzzle piece" should be sub-indented Column 13,
Line 29, "on a display" should read -- on a display, --
Line 34, "video image the" should read -- video image, the --
Line 41, the clause beginning "automatically repositioning a puzzle piece" should be subindented
Line 47, "on a display the" should read -- on a display, the --
Line 49, "puzzle pieces each" should read -- puzzle pieces, each --
Line 50, "image the puzzle" should read -- image, the puzzle --

Column 14,
Line 1, "on a display the" should read -- on a display, the --
Line 31, "video image the" should read -- video image, the --
Line 38, "component the data" should read -- component, the data --
Line 46, "rigsaw" should read -- jigsaw --

Signed and Sealed this

Sixteenth Day of April, 2002

Attest:

*Attesting Officer*

JAMES E. ROGAN
*Director of the United States Patent and Trademark Office*